United States Patent

Jorgensen

[11] Patent Number: 6,032,760
[45] Date of Patent: Mar. 7, 2000

[54] BI-DIRECTIONAL SPRING HOLDER ASSEMBLY FOR AN ACTUATOR

[75] Inventor: Gregory A Jorgensen, Oxford, Mich.

[73] Assignee: Atoma International, Inc., Ontario, Canada

[21] Appl. No.: 08/905,939

[22] Filed: Aug. 5, 1997

[51] Int. Cl.[7] .................................. F03G 1/00; F16F 1/12
[52] U.S. Cl. ................... 185/40 R; 185/40 B; 185/45; 267/150; 267/155
[58] Field of Search ..................... 185/40 R, 45, 185/39, 40 B; 267/150, 155, 157, 166; 16/285, 280

[56] References Cited

U.S. PATENT DOCUMENTS

| | | | |
|---|---|---|---|
| 155,129 | 9/1874 | Warren | 16/280 |
| 870,640 | 11/1907 | Ocumpaug | 16/285 |
| 1,383,815 | 7/1921 | Katzenberger | 16/285 |
| 4,203,573 | 5/1980 | Boss | 185/40 R |
| 4,905,532 | 3/1990 | Fukumoto et al. | 185/40 R |
| 5,106,133 | 4/1992 | Fukumoto et al. . | |
| 5,152,377 | 10/1992 | Yoshigai | 188/24.12 |
| 5,373,752 | 12/1994 | Schlagwein . | |
| 5,375,643 | 12/1994 | Rude | 160/321 |
| 5,464,260 | 11/1995 | Bartel et al. . | |
| 5,472,065 | 12/1995 | Vergin . | |

FOREIGN PATENT DOCUMENTS

| | | | |
|---|---|---|---|
| 1275142 | 11/1960 | France | 267/155 |
| 1373790 | 12/1963 | France | 267/155 |
| 2192252 | 1/1988 | United Kingdom | 267/155 |

*Primary Examiner*—Tamara L. Graysay
*Assistant Examiner*—William C Joyce
*Attorney, Agent, or Firm*—Patton Boggs LLP

[57] ABSTRACT

An actuator for power door locks having a bi-directional spring holder assembly. The assembly has a substantially cylindrical housing having a projection formed on a rim of its cylindrical wall. The projection is provided with first and second abutments facing in opposite directions along the circumference of the rim. A spring is mounted around a shaft which passes through a longitudinal axis of the housing. A first, internal spring end is engaged to the shaft while a second, external spring end projects radially outward of the cylindrical wall. The assembly also includes a spring cover provided with a cover abutment which similarly projects radially outward of the cylindrical wall. When the holder assembly is assembled, the spring is coiled and the cover abutment pushes against the projection's first abutment while the external spring end pushes against the second abutment. The actuator housing is provided with a wall member, one side of which forms a stop for the cover abutment, while the other side serves as a stop for the external spring end. When the gear train is driven, one of the cover abutment and the external spring end abut a corresponding stop, and the entire housing rotates with the output lever, causing the spring to coil. The coiled spring then provides a restoring force, returning the output lever to the neutral position.

9 Claims, 9 Drawing Sheets

BI-DIRECTIONAL SPRING HOLDER ASSEMBLY FOR AN ACTUATOR

FIELD OF THE INVENTION

The present invention relates to bi-directional springs and holders for such springs. Such devices are of particular use in bi-directional rotary and linear actuators where spring return after actuation either clockwise or counter-clockwise is desirable. Actuators of this type are commonly found in power door locks, such as those use in motor vehicles, mechanical double-throw switches, and in other applications calling for movement from a neutral position, to a position in either direction, followed by a return to neutral.

BACKGROUND

Figure 1:
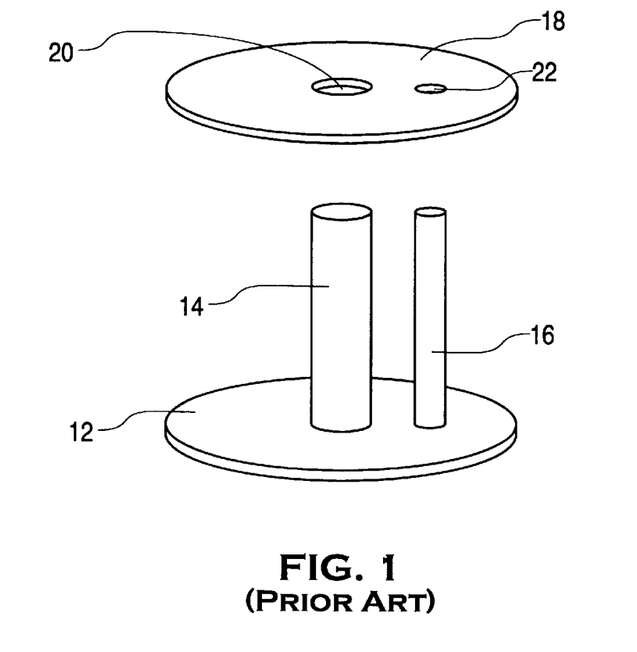
FIG. 1 is an exploded view of a prior art spring holder assembly.

Actuators having bi-directional spring holders are known in the prior art. FIG. 1 of U.S. Pat. No. 5,472,065 shows such a bi-directional spring holder assembly. As shown in FIG. 1 of this patent, a coil spring is wound around a shaft with a first spring end passing on one side of an arbor hook, and a second spring end passing on the other side of the arbor hook. The spring ends abut opposite sides of a wall member which serves as stops to prevent further rotation of corresponding spring ends. When the spring holder assembly is rotated by a gear train in a first direction, the arbor hook abuts a first spring end and coils the spring while the second spring end is maintained by the wall member. When the spring assembly is rotated in the opposite direction, the arbor hook abuts the second spring end and coils the spring while the first spring end is maintained in place by the wall member.

The spring holder assembly of the aforementioned patent is reproduced, in exploded view, in FIG. 1 of the present application. The assembly comprises a substantially circular bottom plate 12 carrying a substantially perpendicular shaft 14 at its center. The prior art spring holder further comprises an arbor hook 16 which is spaced apart from shaft 14, and also extends perpendicular to the bottom plate 12. Shaft 14 and arbor hook 16 are insertable into openings 20 and 22, respectively, formed in top plate 18.

Such prior art spring holder assemblies have two disadvantages, the first is that the coil flexes into a parallelogram, thus deflecting the spring ends and reducing engagement with the wall member within the housing. As a consequence, it is possible that the spring ends may slip off the wall member, thus preventing the spring holder assembly from providing a restoring force. A second disadvantage is encountered in assembling the prior art spring holder assembly. During assembly, one must slip the coil spring over the shaft 14, coil the spring, and ensure that the spring ends are abutting in tension on either side of the arbor hook. This may be a cumbersome process as the spring ends must be maintained in a particular position relative to each other as they are placed on either side of the arbor hook.

In view of these deficiencies, it is desirable to provide a spring holder assembly which is less likely to come apart and, at the same time, it is easy to assemble. The first of these properties would ensure that the spring holder assembly would continue to provide a restoring force even when it is subject to vibration and other disturbances. The second property s desirable, as it reduces manufacturing costs.

SUMMARY OF THE INVENTION

One object of the present invention to provide an actuator having a spring holder assembly in which the spring element is protected by a housing.

Another object of the present invention is to ensure that the tension in the spring is not inadvertently released, thereby resulting in a spring holder assembly being unable to provide a restoring force to an output lever moved from a neutral position in one of two opposite directions to a first or second position.

It is a further object of the invention to provide a spring holder assembly which is easy to assemble due to the interaction of the spring and those elements maintaining the spring in a pretensed position.

These and other objects are achieved by a spring holder assembly in which the spring is protected by a housing with only one end of the spring projecting therefrom. The spring holder is provided with a housing having a bottom member and a substantially cylindrical side wall. A projection formed on a rim of the side wall provides a pair of abutments which face in opposite directions along the circumference of the rim. The projection may extend axially along the rim, parallel to, and offset from, the longitudinal axis of the housing; it may instead be oriented radially outward from the rim. In either case, the spring is inserted into the housing with one end engaged to a shaft of the housing assembly, and the other end engaged to an abutment on the projection. A spring cover, which may be integrally formed with the shaft, is rotatably mounted relative to the housing and is provided with an extending member having a first surface formed with an abutment arranged to abut the second abutment on the projection. When assembled, the spring is pretensed with the second spring end pushing against the projection from one side and an extension formed with an abutment on the spring cover pushing on the opposite side. Holding the second spring end still while turning the housing will coil the spring further, creating a restoring force in one direction. Similarly, holding the spring cover's extension while rotating the housing in the opposite direction also coils the spring, thereby causing a similar restoring force.

The spring cover extension and the second spring end both extend radially outward of the cylindrical wall of the housing. In an actuator, these two elements abut opposite sides of a wall member integrally formed with the actuator housing. In the actuator, a gear train rotates the spring holder assembly and simultaneously moves an output lever from a neutral position to one of a first and a second position. As the gear train drives the spring holder assembly in a first direction, the spring cover extension is stopped by one surface of the wall member of the actuator housing, allowing the housing to rotate and coil the spring, thereby creating a restoring force. After actuation, this restoring force returns the housing to its original position and the output lever to the neutral position. Similarly, when the gear train drives the spring holder assembly in the opposite direction, the second spring end is stopped by an oppositely directed surface of the wall member of the actuator housing. This allows the housing to rotate, thereby coiling the spring and creating a restoring force. This time, however, the restoring force turns the spring holder assembly in the opposite direction, once again returning the output lever to the neutral position.

BRIEF DESCRIPTION OF THE DRAWINGS

The present invention is described with reference to the following figures wherein.

DETAILED DESCRIPTION OF THE INVENTION

Figure 2:
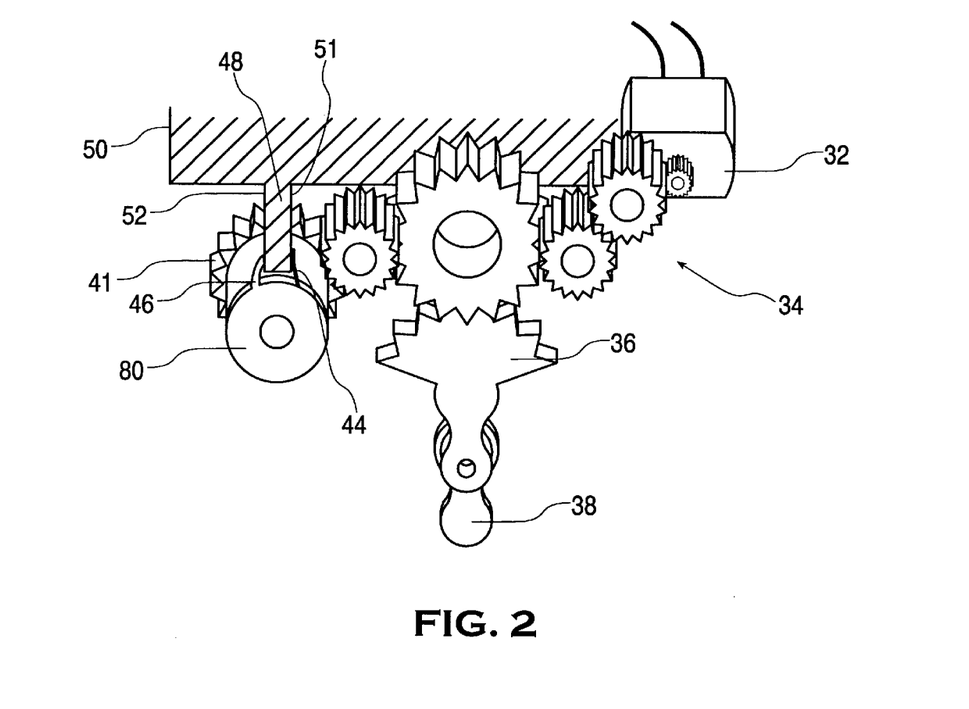
FIG. 2 is a cut-away view of an actuator having a spring holder assembly of the present invention.

FIG. 2 shows a cut away view of an actuator made in accordance with the present invention. The actuator 30 includes a motor 32 which drives a gear train, shown generally as 34. One gear in the gear train turns sector gear 36 which is connected to an output lever 38. Another gear member 41, which normally occupies a neutral position, is directly connected to the housing and turns therewith. Thus, activation of the motor 32 turns both the housing 42 of the spring holder assembly, as well as the output lever 38.

The spring holder assembly 40 includes an external spring end 44, and a spring cover extension 46 having an abutment surface, both of which radially extend beyond the cylindrical side wall of the spring holder housing 42. A wall member 48 integrally formed with actuator housing 50 is between the second spring end 44 and the spring cover extension 46. The wall member 48 is provided with oppositely facing stops 51 and 52. Stop 51 prevents external spring end 44 from rotating counterclockwise while stop 52 prevents spring cover extension 46 from rotating clockwise.

When the motor 32 and gear train are activated in a first direction, the gear member 41 is disturbed from its neutral position and turned in a first direction. As gear member 41 turns with the housing 42, the housing is rotated, causing either the external spring end 44, or the spring cover extension's abutment surface, to be pushed against its corresponding stop. As the housing 42 rotates, it coils the spring 70 within the spring holder assembly, thereby providing a restoring force to return the gear member 41 to the neutral position. Similarly, when the motor 32 are gear train are activated in a second direction opposite from the first direction, the housing 42 turns accordingly, causing the other of the external spring end 44 and the spring cover extension's 46 abutment surface to abut its corresponding stop. This, too, coils the spring 70 and creates a restoring force to return the gear member 41, and thus the housing 42, to its neutral position.

Figure 3:
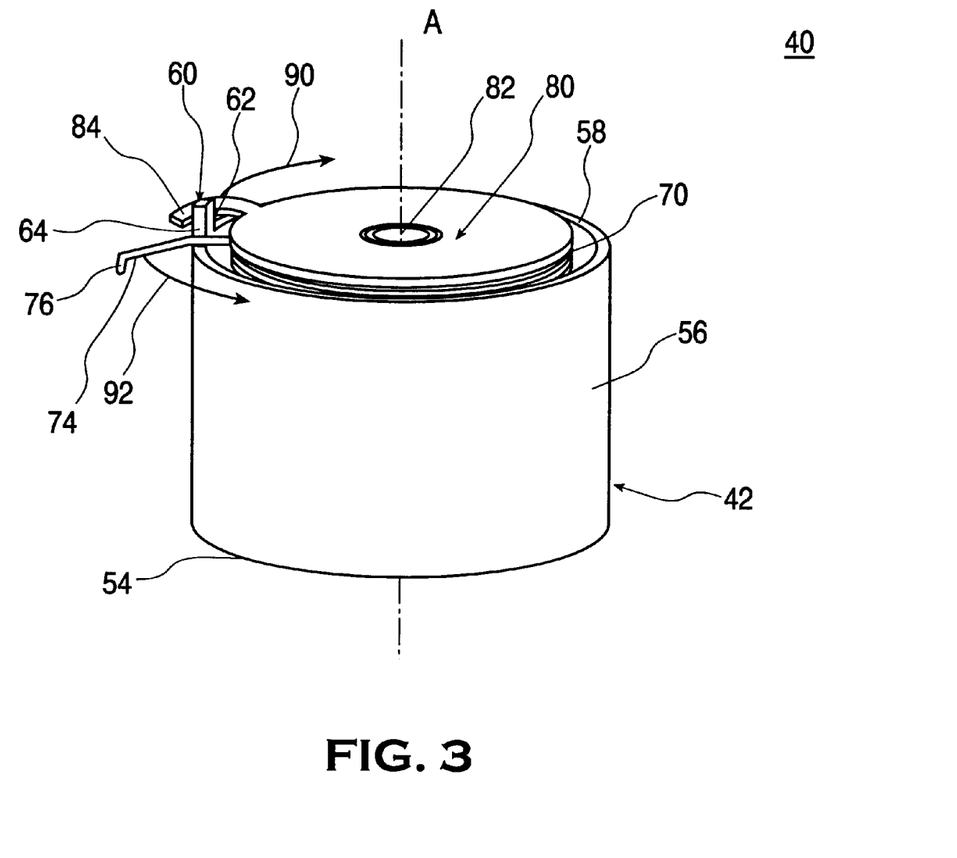
FIG. 3 is perspective view of a spring holder assembly formed in accordance with the present invention.

In FIG. 3, an assembled spring holder assembly 40 is shown. The spring holder assembly 40 comprises a housing 42 having a bottom wall 54 and a substantially cylindrical side wall 56. Formed on a rim 58 of the side wall, is a projection 60. Projection 60 is integrally formed with the side wall and extends in an axial direction parallel the longitudinal axis A of the spring holder assembly 40. The projection 60 is formed with first and second abutments 62, 64 which face in opposite directions along the circumference of the side wall rim 58.

Held within the housing 42, is a coil spring 70. Coil spring 70 is coaxially aligned with the longitudinal axis A. Spring 70 has a first internal end 72 (not shown in FIG. 3) and a second external spring end 74 which projects radially outward from the housing cavity and extends radially beyond the cylindrical side wall 56. Preferably, external spring end 74 is provided with a downward hooked portion 76 which prevents the spring 70 from being retracted into the housing 42 by catching on the cylindrical side wall 56. The hooked portion, though not a necessity, also prevents the spring end from catching on other components. When the spring 70 is under tension, external spring end 74 pushes against second abutment 64, formed on projection 60.

Spring holder assembly 40 further comprises a spring cover 80. Spring cover 80 is mounted such that it may rotate relative to housing 42. Spring cover 80 and housing 42 are connected by a shaft 82 which serves to keep spring cover 80 from wobbling while it is in housing 42. Spring cover 80 is further provided with a spring cover extension 84, depicted in FIG. 3 as an arbor hook. Arbor hook 84 is integrally formed with spring cover 80 and extends radially outward of rim 58. When the spring 70 is under tension, spring cover extension's 84 abutment surface abuts a first abutment 62 formed on projection 60. Thus, if one were to hold the housing 42 and turn the cover abutment 84 in the direction indicated by arrow 90, the external spring end 74 would abut second abutment 64. This coils the spring 70 and creates a restoring force in the opposite direction. Similarly, if the housing were held and the external spring end 74 were rotated in the direction of the arrow 92, the spring cover extension 84 would abut first abutment 62, also coiling the spring and creating a restoring force in the direction opposite to arrow 94.

Figure 4A:
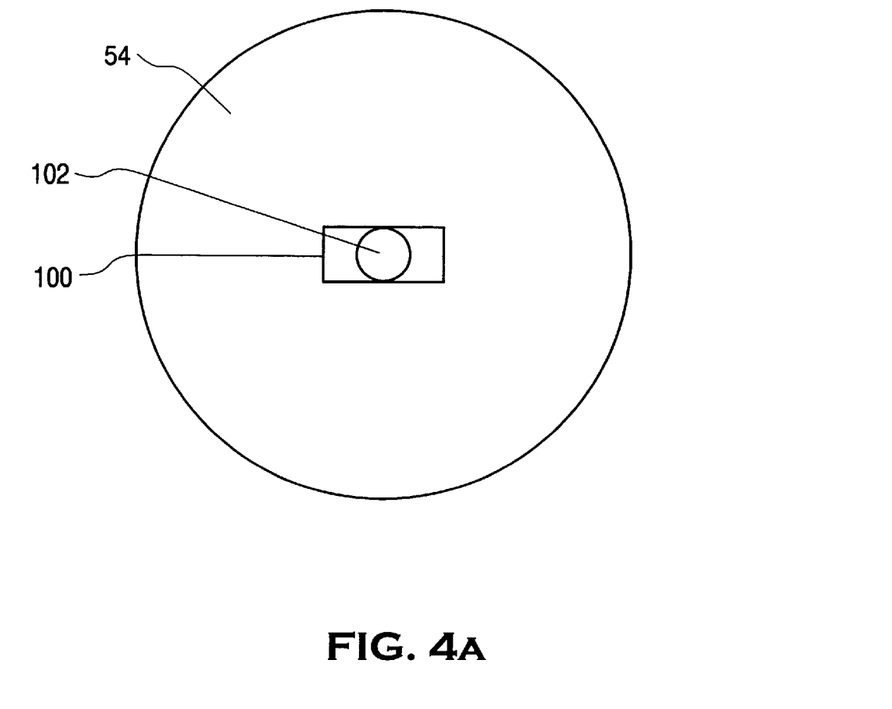
FIGS. 4a and 4b are bottom and side views of housing of the spring holder assembly.
Figure 4B:
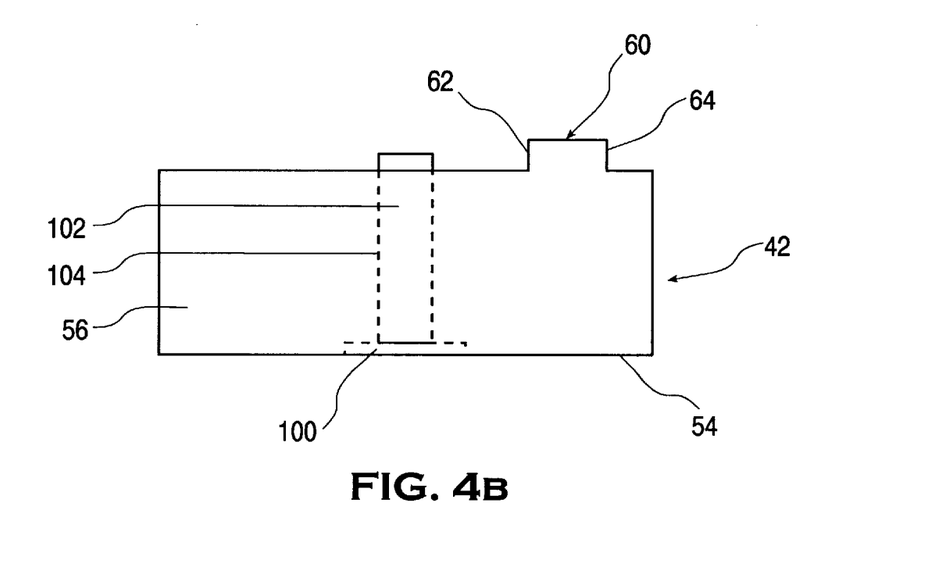

FIGS. 4a and 4b show a bottom view and a side view respectively, of the housing 42 shown in FIG. 3. As seen in the bottom view, the bottom wall 54 is a substantially circular member having a recessed housing sprocket 100 formed at its center. Housing sprocket 100 receives a complimentary male member which turns the housing. Typically, such a male member would be provided on the end of a gear train 34 in a motor driven actuator. Also visible from the bottom view in FIG. 4a is a central opening 102, which is associated with a housing spindle 104, described below.

As seen in the side view of the housing of FIG. 4b, the housing spindle 104, which preferably is hollow, extends from the housing sprocket 100 to just above the rim of side wall 56. A spring may be placed directly over the hollow housing spindle 104. Alternatively, the spring may be placed over an annular shaft of the spring cover which is inserted over the hollow housing spindle 104. Projection 60 rises to a height just above that of the hollow housing spindle 104. As seen in the preferred embodiment, projection 60 has first and second abutments 62, 64 which are substantially parallel to the hollow housing spindle 104, and thus, are parallel to a longitudinal axis of the housing itself.

Figure 5A:
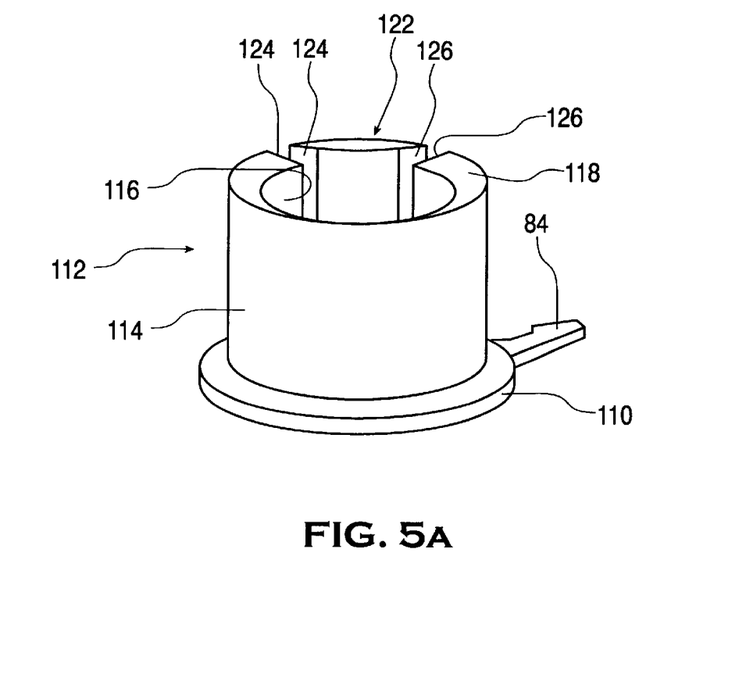
FIGS. 5a and 5b are perspective and side views of the spring cover of the spring holder assembly.
Figure 5B:
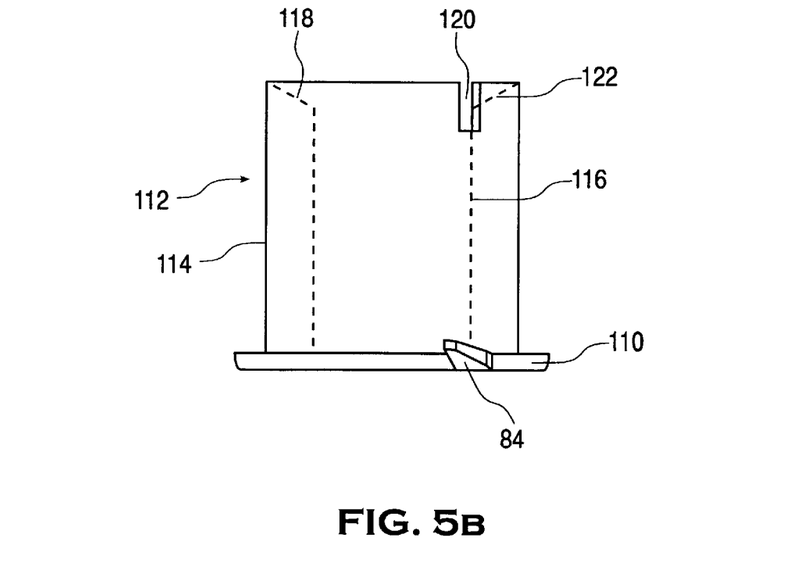

FIGS. 5a and 5b show a perspective and a side view, respectively, of the spring cover 80. Spring cover 80 has a substantially flat cover base 110 which is integrally formed with spring cover extension 84 provided with an abutment surface. Spring cover 80 is also provided with an annular shaft 112 comprising an outer wall 114 and an inner wall 116. An extreme end portion of the annular shaft 112 is provided with a bevel 118. The bevel facilitates insertion of the shaft over housing spindle 104 and also allows room for a sprocket adapted to turn the housing.

The end of the annular shaft 112 is also provided with means for immobilizing one end of a coil spring. These means typically comprise an opening or recess formed in a side wall of the shaft 112. In the preferred embodiment, a dual slot 120, formed as a chord cut out of the end of annular shaft 112, is used for this purpose. The dual slot is defined between two opposing pairs 124, 126 of side walls separating a slot tab 122 from the remainder of the shaft 112. On the other side of dual slot 120 are slot inner walls 124, 126. The purpose of the dual slot is to receive and immobilize one end of a coil spring 70 at two points. It should be evident that a single slot, or a hole, or a recess, or even an adhesive in the shaft 112 may suffice for this purpose. All that is called for is a way to prevent the internal end of the spring from moving relative to the shaft when the spring is coiled, as the housing 42 turns.

Figure 6A:
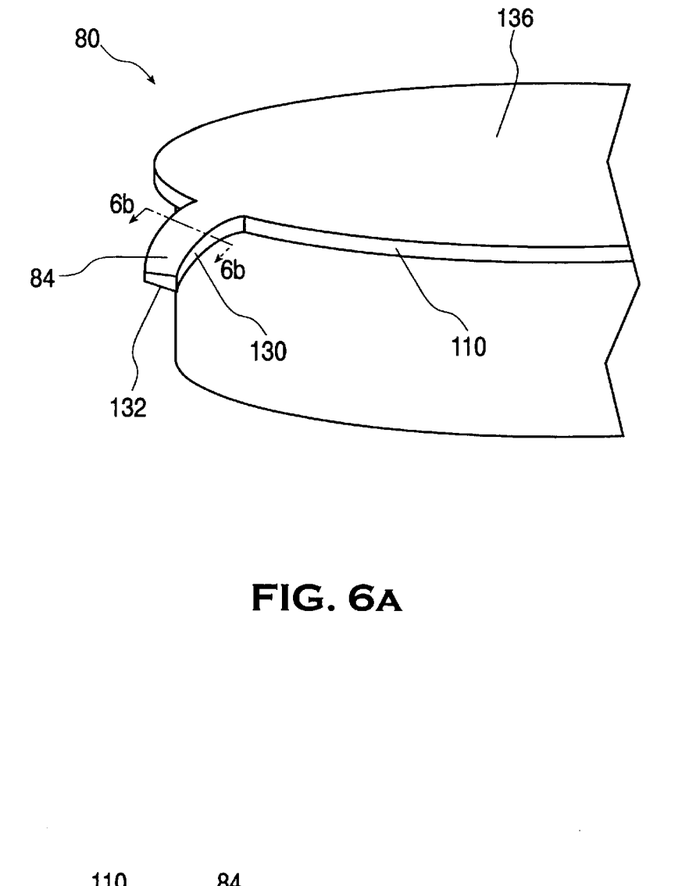
FIGS. 6a and 6b show the ramp member formed on the spring cover extension.
Figure 6B:
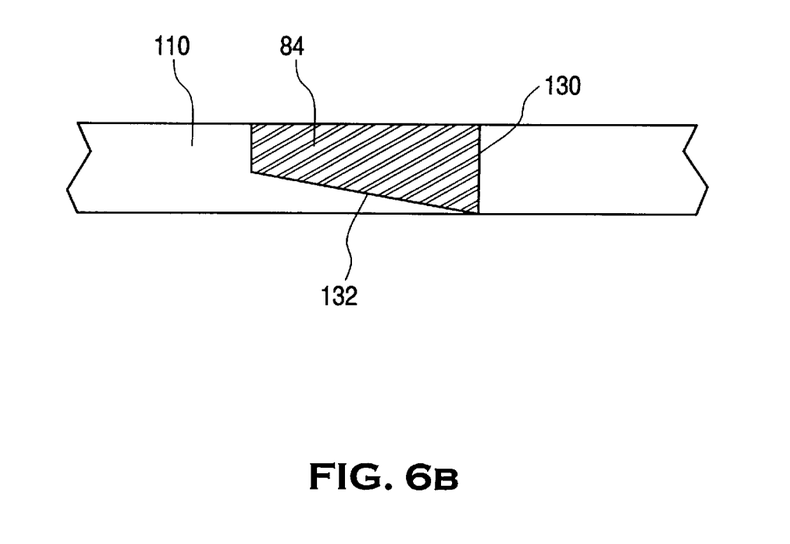

FIG. 6b shows a cross-section of the spring cover extension 84 taken along the lines 6b—6b of FIG. 6a. As seen in the cross-sectional view, spring cover extension 84 has a first, abutting surface 130. Surface 130 abuts first abutment 62 of projection 60, as shown in FIG. 3. The spring cover extension 84 also has a second, inclined ramp surface 132 formed on its underside. Inclined ramp surface 132 is angled towards the top 134 of the cover base 110 in a direction away from the abutting surface 130. The inclined ramp surface 132 facilitates assembling the spring holder assembly 40. During assembly, a spring is first applied over the shaft 112 and secured by placing a first, internal end of the spring into slot 120. The spring and spring cover 80 are then inserted into the housing 42. Then, the spring cover 80 is rotated until a second, external spring end 74 abuts second abutment 64 of projection 60. The spring cover 80 is further wound so that the inclined ramp surface 132 ramps up over the projection 60 until the abutting surface 130 is brought to the other side of projection 60, where it abuts first abutment 62. If additional tension is required, the spring cover 80 may be wound once again, further coiling the spring and bringing the cover abutment 84 full circle past the projection once again.

Figure 6C:
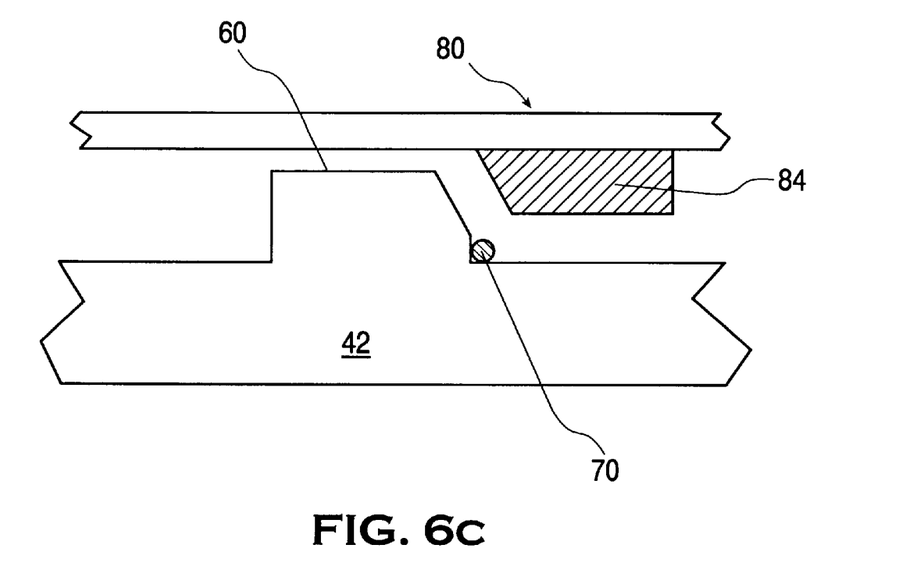
FIGS. 6c and 6d show alternate arrangements for the ramp member.
Figure 6D:
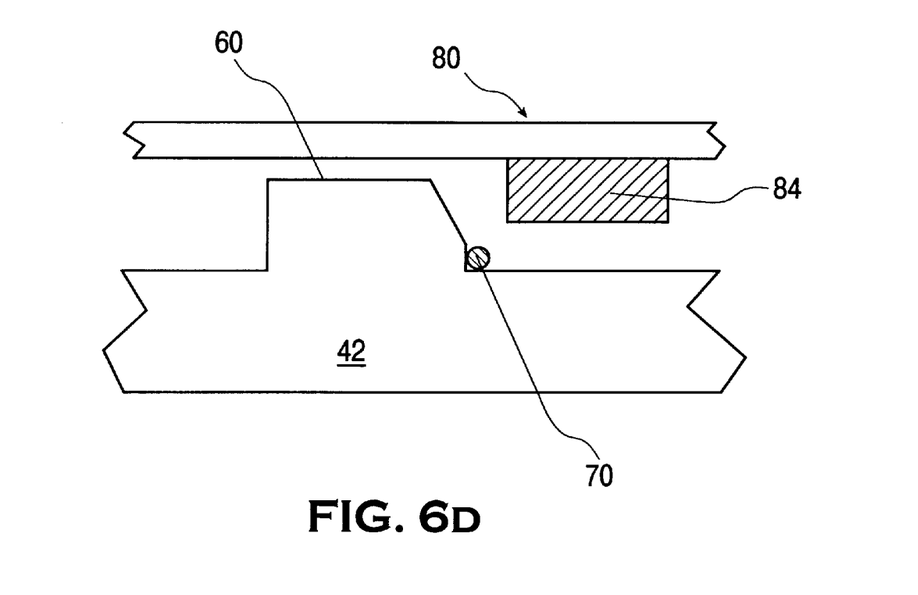

As shown in FIG. 6c, the ramp surface may be placed on a portion of the projection 60, instead of on the underside of the spring cover extension 84. In such case, the ramp surface would be inclined away from the rim of the side wall in a direction towards said first abutment. Alternatively, as shown in FIG. 6d, both the spring cover extension 84 and the projection 60 may be provided with ramps having surfaces which are similarly angled. In this case, as the spring cover is rotated, the ramp formed on the underside of the spring cover extension would engage, and climb up, the ramp formed on the projection. This engagement would continue until the extreme trailing portion of one ramp slips past the other, and the spring cover extension's abutment abuts the first abutment formed on the projection.

In the above description, the projection 60 extends in an axial direction on the rim, parallel to the longitudinal axis A, and the spring cover extension 84 and the external spring end 74 abut oppositely facing sides of the projection just above the rim. As an alternative, the projection 60 may extend in a radial direction. In such case, the spring cover extension and the external spring end are formed with portions which extend parallel to the longitudinal axis A, and abut corresponding sides of the projection.

Figure 7A:
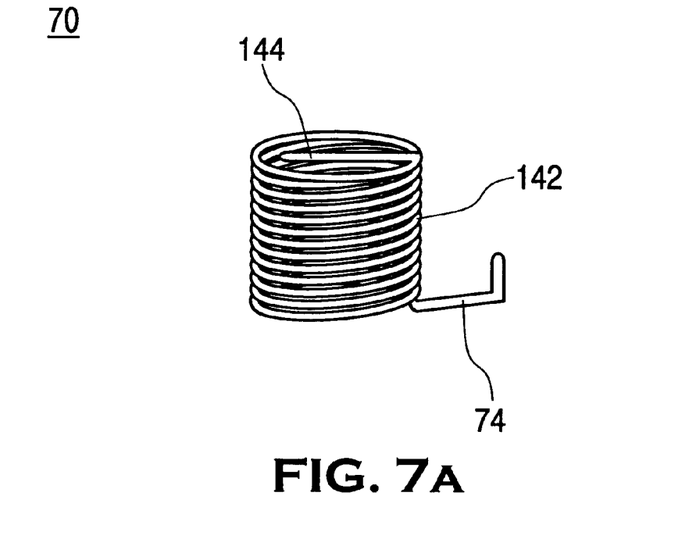
FIGS. 7a and 7b shows a perspective and side view of the spring used in the assembly.
Figure 7B:
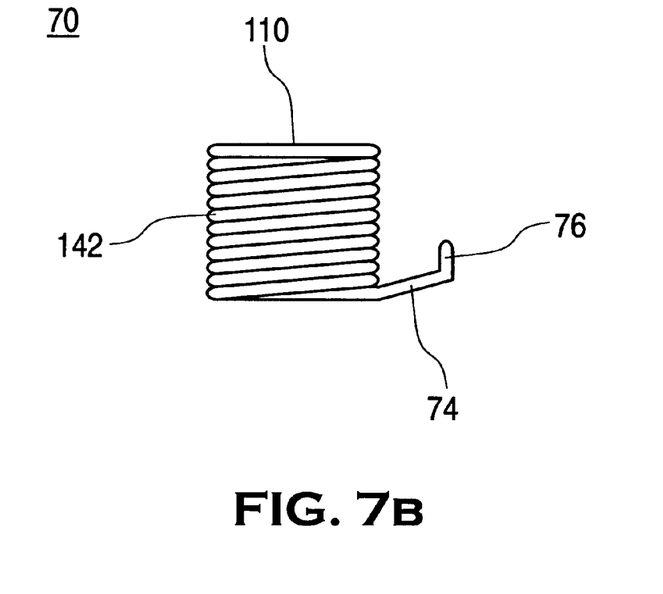

FIGS. 7a and 7b show a perspective and a side view, respectively, of the spring 70, of FIG. 3. Spring 70 is a coil spring having a spring body 142. One end of spring 70 is provided with an internal hook 144. Internal hook 144 is a member which does not extend radially outward of spring body 142. Preferably, internal hook 144 is a straight member, as shown in FIG. 7a. The other end of spring 70 is provided with an external hook 74, which projects radially outward of spring body 142. As seen in FIG. 7b, the hooked end of 76 of external hook 74 is bent towards the opposite end of spring body 142 and is substantially parallel to a central axis of the spring. This arrangement ensures that when the spring 70 is inserted into the housing, as seen in FIG. 3, the external hook 74 and hook end 76 prevent the spring from being accidentally retracted and no longer abutting second abutment 64 of projection 60. It also helps reduce the likelihood that the spring will abut an adjoining surface of an actuator, such as a bearing journal, in which the housing assembly is installed.

Figure 8:
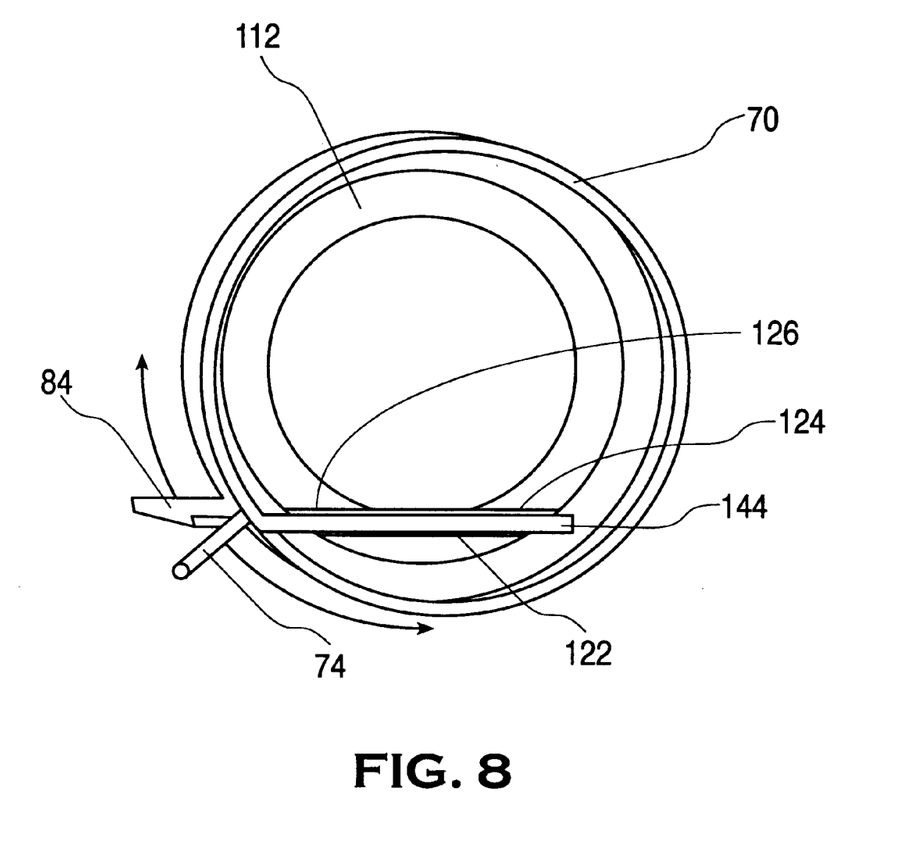
FIG. 8 shows an end view of the sub-assembly of the spring mounted on the spring cover.

FIG. 8 shows a perspective view of the spring 70 inserted over the annular shaft 112. As seen in this figure, the internal spring hook 144 is inserted into the slot 120 between the slot's outer wall 122 and the two slot inner walls 124, 126. When inserted as shown, the external spring hook 74 is proximate the spring cover extension 84 while at the other end, slot 120 accepts internal hook 144.

From the foregoing it is apparent that the spring holder assembly comprises three components: A housing 42, a spring 70 and a spring cover 80 having an attached shaft 112. In the preferred embodiment, the housing and the spring cover are injection molded components made from PVC or other suitable plastic-like material, and may even be formed from a lightweight metal. The spring 70 is made from aluminum, stainless steel or other suitable material, as known to those skilled in the art.

Assembly of this device comprises three steps: First, the spring is inserted over the shaft 112 of the cover member 80 with its internal hook 144 being held in place by slot 120. Second, the spring cover and spring sub-assembly are inserted into the housing 42. Finally, the subassembly is rotated until the external spring hook 74 abuts second abutment 64 of projection 60 and cover abutment 84 passes over projection 60 and then abuts first abutment 62. If more tension is required in the spring 70, the spring cover 80 is rotated a full circle while the external spring hook 74 continues to push against first abutment 62. In this case, the spring 70 is coiled even tighter because the internal spring hook 144 turns with the shaft 112, which is integrally formed with the spring cover 80.

As an alternative to the first two steps, one may first insert the spring into the housing, and then insert the spring cover into the housing. Then, rotating the spring cover will cause the slot 120 of the shaft 112 to catch the internal spring hook of the spring 70. In this manner, the internal spring hook is aligned with the slot, thus immobilizing that end of the spring when the housing is subsequently turned.

Figure 9A:
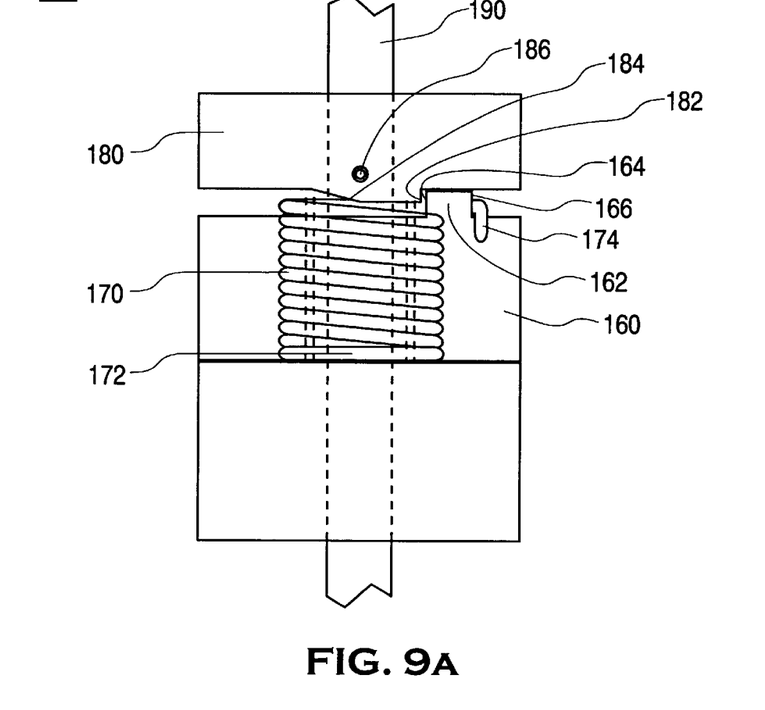
FIGS. 9a & 9b show an alternate embodiment of a spring holder assembly.
Figure 9B:
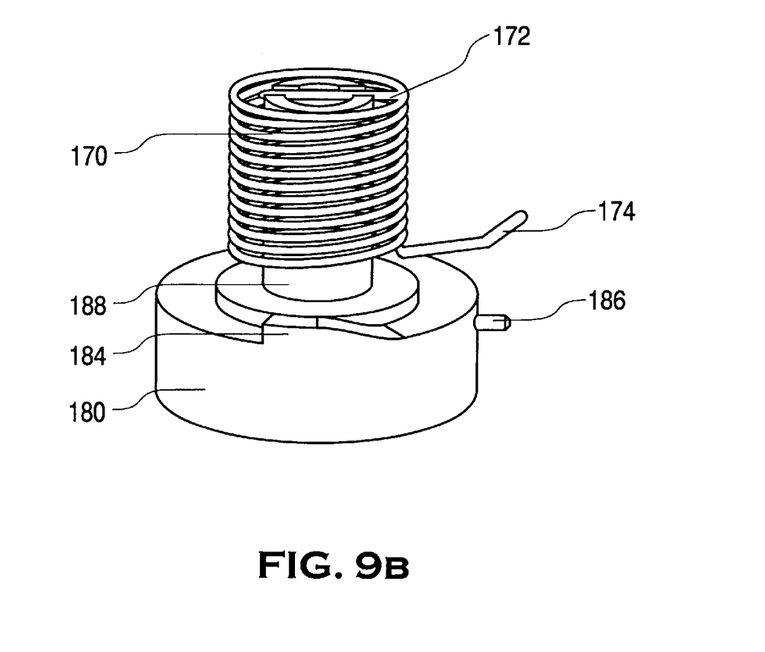

FIGS. 9a & 9b show an alternate embodiment of an assembly in accordance with the present invention. Assembly 150 comprises a housing 160, a spring 170, a spring cover 180 and a retaining shaft 190, which passes through openings formed in housing 160 and spring cover 180. Housing 160 is provided with a projection 162 and first and second abutments 164, 166. Spring cover 180 is provided with a spring cover extension 182 which does not extend radially outward of the cylindrical wall of housing 160. Spring cover 180 has a ramp-like inclined ramp surface 184 which is inclined away from the rim of housing 160 in a direction away from an abutment surface of the spring cover extension 182. Spring cover 180 is also provided with a pin 186 which projects radially outward of the periphery of the remainder of the spring cover 180 and housing 160. Pin 186 serves as a retaining means to keep the spring cover in place as the housing 160 is turned relative thereto. Spring cover 160 is also provided with an integrally formed spring cover shaft 188 which is inserted into the housing 160. Spring cover shaft 188 is provided with an opening or other slot to retain the internal hook of a spring. Spring cover 180 is maintained in place relative to housing 160 by retaining shaft 190. Although in the preferred embodiment the retaining shaft 190 is a separate piece, it may instead be integrally formed with the housing 160, thus reducing the total number of parts.

Spring 170 is provided with an internal hook 172 which catches on to spring cover shaft 188 within housing 160. The other end of the spring 170 is provided with an external hook 174 which pushes against second abutment 166. External hook 174 projects radially outward of housing 160 and spring cover 180. Thus, pin 186 and external hook 174, both of which extend radially outward of the housing and spring cover, may be used to abut oppositely facing stops of a wall member of an actuator housing. This allows the housing 160 to rotate in one direction or the other. When the pin 186 hits one stop of a wall member, the housing 180 can rotate, coiling the spring. When, on the other hand, the external spring hook 174 hits the other stop of a wall member, the housing 160 and the spring cover turn together, also coiling the spring.

It should be evident from the foregoing, that the spring cover assembly of the present invention not only is easy to assemble, but also has features such as an enclosed spring and spring hook which prevent inadvertent disassembly. It should also be recognized that the spring cover assembly of the present invention may be made of many different types of materials, and formed in many different sizes. Thus, it may be used in various applications calling for a restoring force following bidirectional motion from a neutral position.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

What is claimed is:

1. A bi-directional spring holder assembly comprising:
   a housing having a longitudinal axis, a side wall, and a projection formed on a rim of said side wall, said projection being provided with oppositely facing first and second abutments;
   a spring cover connected to the housing and rotatable around said longitudinal axis, said spring cover having a spring cover extension provided with a first surface adapted to abut said first abutment; and
   a shaft attached to said spring cover and extending along said longitudinal axis;
   a spring inserted into said housing, said spring having a first spring end engaged to said shaft such that said first spring end is immobilized relative thereto, and a second spring end extends radially outwardly of said side wall to abut said second abutment.

2. The bi-directional spring holder assembly of claim 1, further comprising a ramp surface formed on at least one of
   the spring cover extension, said ramp surface being inclined with respect to said rim of said side wall and said first surface; and
   the projection, said ramp surface being inclined away from a rim of said side wall in a direction towards said first abutment.

3. The bidirectional spring holder assembly of claim 2, wherein the ramp surface is formed on the spring cover extension.

4. The bidirectional spring holder assembly of claim 1, wherein said projection extends in an axial direction, and said second spring end and said spring cover extension extend in a radial direction.

5. The bidirectional spring holder assembly of claim 1, wherein:
   the shaft is integrally formed with said spring cover with said first spring end being engaged in an opening formed in said shaft; and
   said housing is provided with a spindle integrally formed therewith and extending along said longitudinal axis, said shaft and spring cover being rotatably mounted on said spindle.

6. The bidirectional spring holder assembly of claim 1, wherein said spring cover extension also extends radially outward of said side wall.

7. The bi-directional spring holder assembly of claim 2, wherein the shaft is integrally formed with the spring cover and an opening is formed in the shaft, with said first spring end being engaged in said opening.

8. An actuator comprising:
   an actuator housing;
   an electric motor mounted in said actuator housing and operatively engaged to at least one gear member normally occupying a neutral position;
   a bi-directional spring holder assembly connected to said gear member, said bi-directional spring holder assembly comprising:
      a spring housing having a longitudinal axis, a side wall, and a projection formed on said side wall, said projection being provided with oppositely facing first and second abutments;
      a spring cover connected to the housing and rotatable around said longitudinal axis, said spring cover having a spring cover extension provided with a first surface adapted to abut said first abutment; and
      a spring inserted into said spring housing, said spring having a first spring end engaged to said spring cover such that said first spring end is immobilized relative thereto, and a second spring end extending radially outward of said side wall and arranged to abut said second abutment; and
   an output lever operatively driven by said motor, said output lever movable between at least first and second positions; wherein
   said at least one gear member turns said spring housing and coils said spring when said motor is energized such that at least one of said second spring end and said spring cover extension abutting a surface of said actuator housing, said coiled spring returning said at least one gear member to said neutral position, when the motor is no longer energized.

9. The actuator of claim 8, further comprising a wall member provided with a pair of stops facing in opposite directions, said spring second end abutting a first stop when the motor is energized in a first direction, and said cover abutment abutting a second stop, when the motor is energized in a second direction.

* * * * *